United States Patent
Veis et al.

(10) Patent No.: US 10,377,161 B2
(45) Date of Patent: Aug. 13, 2019

(54) OVERCOAT PRINTING AND SERVICING

(71) Applicant: HP SCITEX LTD., Netanya (IL)

(72) Inventors: Alex Veis, Kadima (IL); Ron Tuttnauer, Netanya (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 15/681,533

(22) Filed: Aug. 21, 2017

(65) Prior Publication Data

US 2018/0117940 A1    May 3, 2018

(30) Foreign Application Priority Data

Oct. 31, 2016  (EP) ..................................... 16196653

(51) Int. Cl.

| | |
|---|---|
| *B41J 2/165* | (2006.01) |
| *B41M 1/04* | (2006.01) |
| *B41F 5/24* | (2006.01) |
| *B41M 1/18* | (2006.01) |
| *B41J 2/515* | (2006.01) |
| *B41F 23/04* | (2006.01) |
| *B41J 2/21* | (2006.01) |
| *B41J 25/304* | (2006.01) |

(Continued)

(52) U.S. Cl.
CPC .................. *B41M 1/04* (2013.01); *B41F 5/24* (2013.01); *B41J 2/16585* (2013.01); *B41J 2/515* (2013.01); *B41M 1/18* (2013.01); *B41F 23/0409* (2013.01); *B41J 2/2114* (2013.01); *B41J 25/304* (2013.01); *B41J 29/393* (2013.01); *C09D 11/101* (2013.01)

(58) Field of Classification Search
CPC .... B41J 2/165; B41J 2/16517; B41J 2/16588; B41J 29/38; B41J 2002/16573; B41J 2002/16576

See application file for complete search history.

(56) References Cited

U.S. PATENT DOCUMENTS

| | | | |
|---|---|---|---|
| 6,755,504 B2 | 6/2004 | Tee et al. | |
| 8,939,536 B2 | 1/2015 | Smith | |

(Continued)

FOREIGN PATENT DOCUMENTS

| | | |
|---|---|---|
| CN | 101119848 | 2/2008 |
| CN | 101229726 | 7/2008 |
| CN | 101663171 | 3/2010 |

OTHER PUBLICATIONS

Einat, M. et al.,Two-dimension Full Array High-speed Ink-jet Print Head, Aug. 15, 2006, < http://www.ariel.ac.il/sites/einat/JeTrix%20-%20ApplPhysLett_89_073505.pdf >.

*Primary Examiner* — Scott A Richmond
(74) *Attorney, Agent, or Firm* — HP Inc. Patent Department

(57) ABSTRACT

In certain examples described herein, a depositing mechanism performs an overcoat depositing operation. The depositing mechanism comprises a plurality of print head arrays. Each print head array is arrangeable in a deposit position to deposit an overcoat layer onto a substrate and a service position to enable servicing to be performed. In certain cases, an array controller causes at least one print head array of the plurality of print head arrays to be moved periodically from the deposit position to the service position according to a predefined servicing sequence during an ongoing overcoat depositing operation performed by the depositing mechanism.

18 Claims, 4 Drawing Sheets

(51) Int. Cl.
*B41J 29/393* (2006.01)
*C09D 11/101* (2014.01)

(56) References Cited

U.S. PATENT DOCUMENTS

| | | | |
|---|---|---|---|
| 9,403,367 B2 | 8/2016 | Reder | |
| 2003/0071864 A1* | 4/2003 | Walfer | B41J 2/2139 |
| | | | 347/14 |
| 2003/0202026 A1 | 10/2003 | Smith et al. | |
| 2005/0069365 A1 | 3/2005 | Miller et al. | |
| 2006/0227157 A1 | 10/2006 | Drake et al. | |
| 2009/0091596 A1 | 4/2009 | Askeland et al. | |
| 2009/0262159 A1 | 10/2009 | Lang | |
| 2010/0066779 A1* | 3/2010 | Gothait | B41J 2/16579 |
| | | | 347/14 |
| 2011/0221807 A1 | 9/2011 | Yoshida | |
| 2011/0222079 A1 | 9/2011 | Bezenek et al. | |
| 2015/0251431 A1 | 9/2015 | Cessel et al. | |
| 2015/0251433 A1* | 9/2015 | Miyazawa | B41J 2/16541 |
| | | | 347/33 |
| 2016/0107447 A1* | 4/2016 | Reder | B41J 2/16588 |
| | | | 347/22 |

\* cited by examiner

OVERCOAT PRINTING AND SERVICING

CROSS-REFERENCE TO RELATED APPLICATION

This application claims foreign priority to European Patent Application No. 16196653.6, filed on Oct. 31, 2016, and entitled "OVERCOAT PRINTING AND SERVICING".

BACKGROUND

Overcoat fluids, such as varnishes, may be applied to a print medium, over a printed ink layer, in order to provide protection and/or visual enhancement of the ink and/or the print medium. Such overcoat fluids may be deposited onto the print medium via flexography or other press printing techniques. Some overcoat fluids may have a relatively high solid content and/or a relatively high viscosity compared with other fluids used in printing, such as colored inks.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Figure 1:
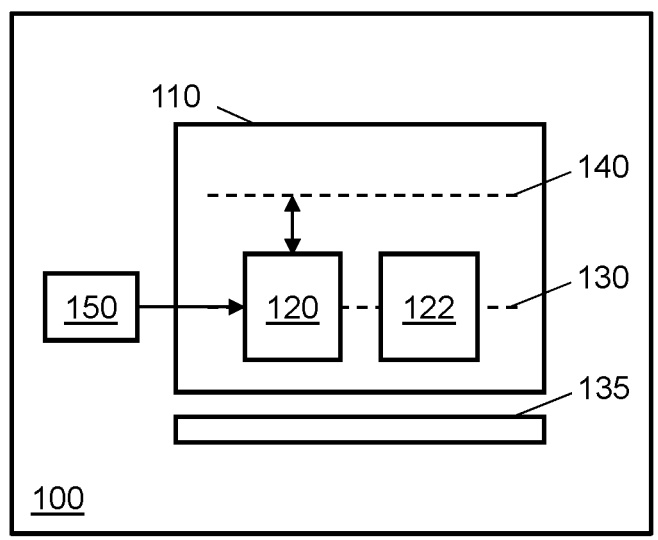
FIG. 1 is a schematic diagram of an apparatus according to an example.

Overcoat fluids may be deposited onto a substrate via analog printing techniques such as flexographic printing. Overcoat fluids may be applied to protect a substrate from sources of damage such as scratching, smearing and moisture. Additionally or alternatively, overcoat fluids may be applied to improve the visual appearance of printed images, for example by introducing or increasing gloss and/or by increasing a color gamut. More generally, an overcoat fluid may comprise any fluid that can be used to protect or enhance an image by forming an overcoat layer over a printed layer. Examples of overcoat fluids include, but are not limited to, varnishes, glosses, resins, drying oils, ultraviolet-curable liquids, plastics and acrylics. Some analog printing techniques may be relatively expensive compared with digital printing techniques. In addition, some analog presses may not allow a fine-grained or flexible control of overcoat distribution. For example, an overcoat fluid may be applied uniformly over the entirety of a substrate, but may not be selectively applied to certain portions of the substrate. Thus, overcoat fluid may be wasted when using such press printing techniques.

Flexibility in controlling overcoat fluid deposition may be improved, and associated costs and fluid wastage may be reduced, by jetting the overcoat fluid onto a substrate via one or more print heads. In general, a print head may use thermal and/or piezoelectric actuators to eject a fluid through its associated nozzles. However, an overcoat fluid may have a relatively high solid content and/or a relatively high viscosity compared with other fluids, such as colored inks, that may be jetted via such print heads. For example, an overcoat fluid may have a solid content of 20-30% and a viscosity of 15-400 cP, compared with a solid content of 0.5-5% and a viscosity of 2-15 cP for colored inks. There is a risk therefore that an overcoat fluid may dry in the nozzles associated with the print head due to the relatively high solid content, leading to nozzle blockages or other types of nozzle malfunction. Overcoat fluid residuals may also dry on a nozzle plate of the print head. Removing a dried overcoat fluid from the nozzles and/or nozzle plate of a print head may be difficult or even impossible. Removal of a partially dried or cured overcoat fluid may be similarly difficult. There is therefore a risk of permanent damage to print heads used for depositing overcoat fluid if they are not cleaned thoroughly soon after use.

Certain examples described herein enable a print head array comprising a plurality of print heads to be serviced periodically whilst one or more other print head arrays deposit an overcoat fluid onto a substrate. The print head array may be serviced according to a predefined servicing sequence. By using a predefined servicing sequence, the print head array may be serviced before the overcoat fluid can cause damage to its associated print heads. Consequently, overcoat fluids may be reliably deposited using digital print head techniques with reduced risk of damage to respective print heads.

Certain examples described herein enable a flexible and fine-grained control of overcoat distribution on a substrate. For example, a varnish may be deposited onto certain portions of a substrate, for example certain portions of a blank for a box, and not deposited onto other portions, for example those portions of the blank to which an adhesive may subsequently be applied. Consequently, wastage of overcoat fluid may be reduced. Additionally, the quality of products upon which the overcoat fluid is applied may be improved.

Certain examples described herein involve enabling a print head array to be serviced according to a periodic servicing sequence. The periodic servicing sequence may have a predefined servicing interval between servicing operations. By enabling servicing to be performed according to a predefined sequence, servicing may be performed pre-emptively. Consequently, the likelihood of damage to the print head array may be reduced, and the longevity of the print head array may be improved.

Certain examples described herein enable overcoat fluids to be deposited using digital printing techniques instead of analog techniques such as flexography. The time taken to set up an overcoat depositing operation may thereby be reduced. Thus, overcoat depositing operations may be made more efficient.

Certain examples described herein enable print heads to be grouped into arrays, with each print head in a given array being treated similarly to the other print heads in the given array. For example, each print head in a given array may be moved to a service position and/or serviced simultaneously. By grouping individual print heads into print head arrays, the speed and efficiency of servicing the print heads may be improved. Furthermore, controlling print head arrays instead of individual print heads may reduce system complexity.

Certain examples described herein enable print heads to be serviced in parallel with an ongoing overcoat depositing operation. By servicing print heads in parallel with an ongoing depositing operation, system downtime may be reduced compared with a case in which servicing is performed following interruption of the depositing operation. The depositing operation may therefore be performed in a single, uninterrupted pass. As a consequence of a reduced system downtime, an overall printing throughput may be increased.

Certain examples described herein enable overcoat fluids to be printed using low resolution print heads. Low resolution print heads may be less expensive than high resolution print heads. A large number of such print heads, grouped into arrays, may therefore be employed. Using a large number of print heads may allow a greater number of the print heads to be redundant at any given time. For example, one or more entire arrays of print heads may be redundant at any given time during an overcoat printing operation.

FIG. 1 shows an apparatus 100 according to an example. The apparatus 100 may be comprised in a printing system, for example an industrial press. In some examples, the apparatus 100 is arranged separately from a printing system. A "printer", "printing system" or "depositing system" as described herein may comprise any device suitable for performing an additive manufacturing process, which may include, but not be limited to, systems for additive manufacturing in two-dimensions and/or three-dimensions.

The apparatus comprises a depositing mechanism 110 to perform an overcoat depositing operation. The depositing mechanism 110 may comprise a fluid ejection mechanism. The depositing mechanism 110 comprises a plurality of print head arrays 120, 122. The plurality of print head arrays 120, 122 may be coupled to the depositing mechanism 110 via one or more couplings (not shown). Each of the plurality of print head arrays 120, 122 may be removable and/or replaceable. Each of the plurality of print head arrays 120, 122 may comprise a number of print heads. For example, each of the plurality of print head arrays 120, 122 may comprise between 20 and 100 print heads. In some examples, each of the plurality of print head arrays 120, 122 comprises a print head bar coupled to a plurality of print heads. Print heads may be removable and/or replaceable from each of the plurality of print head arrays 120, 122. Each print head in a given print head array may comprise a plurality of nozzles. A given print head may use thermal and/or piezoelectric actuators to eject an overcoat fluid through its associated nozzles. The nozzles may also be coupled to one or more overcoat fluid chambers and/or reservoirs. "Nozzle" as discussed herein may refer to at least one of an ejection mechanism comprising an actuator, an aperture in a print head and any overcoat fluid chambers. The print head arrays may be configured to operate at a relatively low resolution, for example in the range 50-2400 dots-per-inch (dpi).

Each of the plurality of print head arrays 120, 122 is arrangeable in a deposit position 130 to deposit an overcoat layer onto a substrate 135. The overcoat layer may be formed of an overcoat fluid. The overcoat layer may be deposited over an ink layer printed upon the substrate 135. The overcoat layer may protect or enhance a printed image. In some examples, the overcoat fluid comprises a colorless fluid. In some examples, the overcoat fluid is transparent to enable the ink layer to remain visible after depositing the overcoat layer. In other examples, the overcoat fluid is at least partially opaque to enable the visual appearance of the ink layer to be altered. In some examples, the overcoat fluid is a water-based fluid. In some examples, the overcoat fluid is an ultraviolet-curable fluid. A number of different overcoat fluids may be used by the apparatus 100. Different overcoat fluids may have different physical, chemical and/or visual properties. When applied onto a substrate, different overcoat fluids may have variable levels of protection, variable friction coefficients, and variable visual finishes, for example gloss or matt.

Each of the plurality of print head arrays 120, 122 is also arrangeable in a service position 140 to enable servicing to be performed, for example on the given print head array. In some examples, performing a servicing operation on a given print head array comprises performing a wiping operation. The given print head array may be wiped using one or more of a rubber scratcher, a dry fabric or a wet fabric. Wiping the given print head array may reduce the aggregation of solid overcoat residues in and/or around the given print head array. In some examples, performing a servicing operation on the given print head array comprises performing a spitting operation. A spitting operation may comprise jetting, or "spitting", a fluid through one or more of the nozzles associated with the given print head array. Such a fluid may comprise the overcoat fluid or a different fluid. In this case, "spitting" a nozzle may be defined as activating a fluid ejection actuator associated with the nozzle, e.g. applying a voltage via print head control electronics. "Spitting" may prevent the accumulation of solid material, for example dried overcoat residue, in and/or around the nozzles associated with the given print head array.

The apparatus 100 also comprises an array controller 150. In some examples, the array controller 150 is communicatively coupled to the deposit mechanism 110. In some examples, the array controller 150 is communicatively coupled to at least one print head array in the plurality of print head arrays 120, 122, for example print head array 120. The array controller 150 may, according to some examples, comprise control electronics to control the at least one print head array 120.

The array controller 150 is configured to cause the at least one print head array 120 to be periodically moved from the deposit position 130 to the service position 140 during an ongoing overcoat depositing operation performed by the depositing mechanism 110. In some examples, the array controller 150 is configured to cause the at least one print head array 120 to be moved by generating one or more signals. The one or more signals may comprise one or more control signals. The one or more control signals may be output for transmission to the depositing mechanism 110, the at least one print head array 120, or one or more further entities (not shown) to cause the at least one print head array 120 to be moved to the service position 140. The one or more signals may comprise one or more indicator signals. The one or more indicator signals may be converted to a visual and/or an audio output to indicate that the at least one print head array 120 is to be moved to the service position 140.

In some examples, the array controller 150 is configured to cause the at least one print head array 120 to be moved to the service position 140 temporarily. For example, the array controller 150 may be configured to cause the at least one print head array 120 to be moved back to the deposit position 130 once a servicing operation performed on the at least one print head array 120 is completed. In some examples, the array controller 150 is configured to cause the at least one print head array 120 to be moved to the service position 140 repeatedly during the ongoing overcoat depositing operation. For example, the at least one print head array 120 may be moved from the deposit position 130 to the service position 140, back to the deposit position 130, back to the service position 140, and so on, during an ongoing overcoat depositing operation.

The at least one print head array 120 is moved according to a predefined servicing sequence. The predefined servicing sequence may determine the periodicity or frequency with which the array controller 150 causes the at least one print head array 120 to be moved to the service position 140. In some examples, the predefined servicing sequence indicates an order in which the plurality of print head arrays 120, 122 are serviced. The predefined servicing sequence may be obtained by the array controller 150. In one example, the array controller 150 is configured to determine the predefined servicing sequence. In another example, the array controller 150 is configured to receive the predefined servicing sequence, for example from at least one other entity (not shown). The predefined servicing sequence may be obtained prior to commencement of the overcoat depositing operation performed by the depositing mechanism 110. The predefined servicing sequence may relate to a servicing schedule for servicing the plurality of print head arrays 120, 122. In some examples, the predefined servicing sequence has a predefined service interval between servicing operations for each print head array of the plurality of print head arrays 120, 122. The predefined service interval may represent a time period during which a given print head array is between servicing operations.

In some examples, the predefined service interval is determined by at least one characteristic of the overcoat fluid. Examples of characteristics of the overcoat fluid include, but are not limited to, solid content, viscosity, density, drying time and curing time. In some examples, the predefined service interval is determined by at least one characteristic of an operating environment of the apparatus 100. The operating environment may influence a drying characteristic of the overcoat fluid. Examples of characteristics of the operating environment include, but are not limited to, temperature, humidity and air flow. In some examples, the predefined service interval is determined by at least one characteristic of the at least one print head array 120. Examples of characteristics of the at least one print head array 120 include, but are not limited to, resolution of each print head in the array, number of print heads in the array, number of nozzles associated with each print head, nozzle size, print head size, number of print head arrays in the plurality of print head arrays and number of redundant print head arrays in the plurality of print head arrays.

In some examples, the array controller 150 is configured to cause at least one further print head array of the plurality of print head arrays, for example print head array 122, to be moved from the deposit position 130 to the service position 140 when the at least one print head array 120 is in the deposit position 130. Thus, each of the plurality of print head arrays 120, 122 may be serviced sequentially without interruption of the overcoat depositing operation. The array controller 150 may be configured to cause the at least one further print head array 122 to be moved to the service position 140 according to the predefined servicing sequence.

In some examples, the apparatus 100 comprises a media transport system (not shown). The media transport system may comprise an arrangement of one or more belts and/or one or more rollers to transport the substrate 135. These belts and/or rollers may be driven by a drive mechanism, e.g. one or more electromechanical motors. The media transport system may be arranged to transport the substrate 135 during an overcoat depositing operation performed by the depositing mechanism 110.

In some examples, the apparatus 100 further comprises a service module (not shown). The service module may be configured to perform servicing on the at least one print head array 120 when the at least one print head array 120 is in the service position 140. The service module may, in certain examples, be moveable between different print head arrays of the plurality of print head arrays 120, 122. In such examples, the distance of travel and/or the complexity of movement of each print head array to enable servicing to be performed is reduced. For example, a given print head array may be moved perpendicularly from the deposit position 130 to the service position 140 by raising the print head array. Raising the print head array may enable the service module to converge with the raised print head array in order for servicing to be performed. In other examples, the service module is a static service module. In such other examples, moving a given print head array to the service position 140 comprises moving the print head array to a position associated with the static service module.

In some examples, the service module is coupled to the at least one print head array 120 to enable servicing to be performed. Coupling the service module to the at least one print head array 120 may involve forming a physical connection between the service module and the at least one print head array 120 when the at least one print head array 120 is in the service position 140. In other examples, no physical contact is made between the service module and the at least one print head array 120.

Figure 2A:
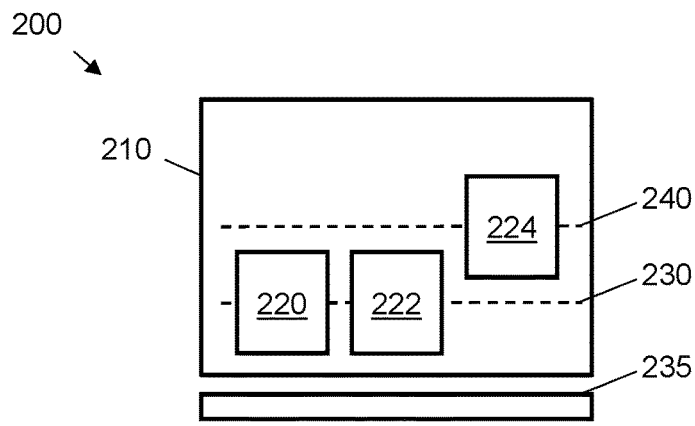
FIG. 2A is a schematic diagram of an apparatus in a first time period according to an example.
Figure 2B:
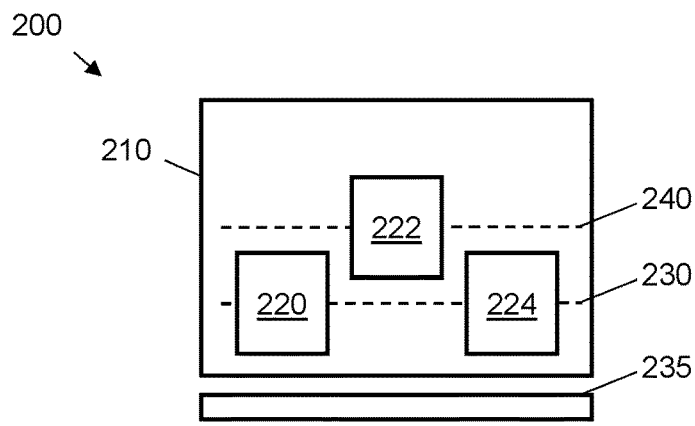
FIG. 2B is a schematic diagram of an apparatus in a second time period according to an example.
Figure 2C:
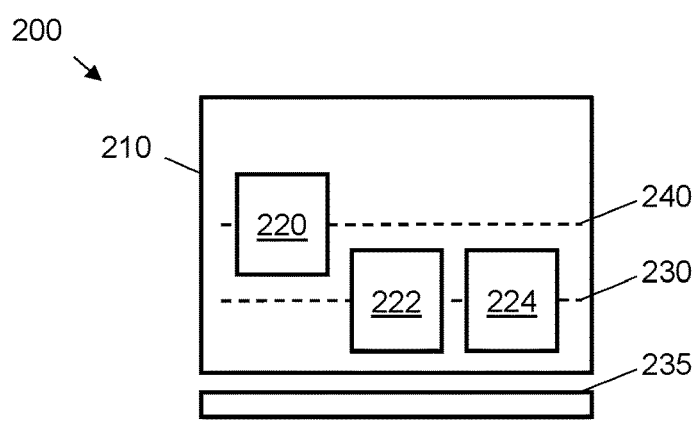
FIG. 2C is a schematic diagram of an apparatus in a third time period according to an example.

FIGS. 2A, 2B and 2C show an apparatus 200 during a first, second and third time period, respectively, according to an example. In this example, the first, second and third time periods are consecutive time periods. In other examples, the first, second and third time periods may be non-consecutive time periods. Some items depicted in FIGS. 2A, 2B and 2C are similar to items shown in FIG. 1. Corresponding reference signs, incremented by 100, are therefore used for similar items.

The apparatus 200 comprises a depositing mechanism 210 configured to perform an overcoat depositing operation. The depositing mechanism 210 comprises a plurality of print head arrays 220, 222, 224. In this example, the plurality of print head arrays 220, 222, 224 comprises a first print head array 220, a second print head array 222 and a third print head array 224. Each of the plurality of print head arrays 220, 222, 224 is positionable in a deposit position 230 to deposit an overcoat layer onto a substrate 235. Each of the plurality of print head arrays 220, 222, 224 is also positionable in a service position 240 to enable servicing to be performed.

In the example shown in FIG. 2A, the first print head array 220 and the second print head array 222 are positioned in the deposit position 230, and the third print head array 224 is positioned in the service position 240. As such, during the first time period, servicing may be performed on the third print head array 224 whilst the first print head array 220 and the second print head array 222 deposit the overcoat layer onto the substrate 235.

In the example shown in FIG. 2B, the first print head array 220 and the third print head array 224 are positioned in the deposit position 230, and the second print head array 222 is positioned in the service position 240. As such, during the second time period, servicing may be performed on the second print head array 222 whilst the first print head array 220 and the third print head array 224 deposit the overcoat layer onto the substrate 235.

In the example shown in FIG. 2C, the second print head array 222 and the third print head array 224 are positioned in the deposit position 230, and the first print head array 220 is positioned in the service position 240. Thus, during the third time period, servicing may be performed on the first print head array 220 whilst the second print head array 222 and the third print head array 224 deposit the overcoat layer onto the substrate 235.

As such, each of the plurality of print head arrays 220, 222, 224 is serviced sequentially according to a periodic sequence.

In this example, a given print head array of the plurality of print head arrays 220, 222, 224 is "active" for time $T_a$ and is "inactive" for time $T_i$. $T_i$ may commence when the given print head array is moved from the deposit position 230. $T_i$ may include the time taken to move the given print head array from the deposit position 230 to the service position 240, the time taken to service the given print head array, and the time taken to move the given print head array from the service position 240 back to the deposit position 230. $T_a$ may commence when the given print head array is moved to the deposit position 230 and may include the time during which the given print head array deposits the overcoat layer. In one example, the time taken to move a given print head array to the service position 240, service the print head array, and move the print head array back to the deposit position 230 is 30 seconds. $T_i$ is therefore 30 seconds in this example. For the three-array arrangement comprised in the depositing mechanism 210, $T_a$ is therefore 60 seconds. In other words, each print head array is "active" for 60 seconds and is "inactive" for 30 seconds in this example.

More generally, for an arrangement of n print head arrays having one redundant print head array, $T_a=T_i(n-1)$; (n>1).

$T_a$ may represent the time for which a given print head array can reliably print an overcoat fluid. For example, a print head array may be moved to the service position 240 to undergo a servicing operation after the expiry of time $T_a$. $T_a$ may be determined and/or optimized before the commencement of an overcoat depositing operation. Thus, $T_a$ may be predefined. In some examples, $T_a$ is determined by a characteristic of the overcoat fluid. For example, the higher the solid content of the overcoat fluid, the shorter the time for which a given print head array can reliably print the overcoat fluid. $T_a$ may therefore be tuned accordingly. $T_a$ may represent a time between consecutive servicing operations performed on a given print head array. $T_a$ is therefore an example of a predefined servicing period between servicing operations for a given print head array.

As such, each print head array of the plurality of print head arrays 220, 222, 224 may be serviced according to a periodic servicing sequence having a predefined servicing period.

In this example, in each of the three time periods shown, two print head arrays are in the deposit position 230, and may therefore be considered to be "active", and one print head array is in the service position 240 to enable servicing to be performed. In other examples, different numbers of print head arrays may be arranged in each of the deposit position 230 and the service position 240 at any given time. For example, in a case in which there are two print head arrays in total, in any given time period one print head array may be in the deposit position 230 and one print head array may be in the service position 240. In a case in which there are four print head arrays in total, three print head arrays may be in the deposit position 230 whilst one print head array is in the service position 240. In these examples, there is a print head array redundancy of one. That is, at any given time there is one print head array that is not "active" and is therefore redundant.

In other examples, several print head arrays are serviced simultaneously. For example, in the case in which there are four print head arrays in total, two print head arrays may be in the deposit position 230 whilst two print head arrays are in the service position 240. In this example, there are two redundant print head arrays. In a case in which there are six print head arrays in total, three print head arrays may be in the deposit position 230 whilst three print head arrays are in the service position 240, resulting in a print head array redundancy of three. In these examples, $T_a$ equals $T_i$. In other words, a given print head array may spend equal amounts of time being "active" and being "inactive". Other numbers of total print head arrays and/or redundant print head arrays may be used in other examples.

Figure 3:
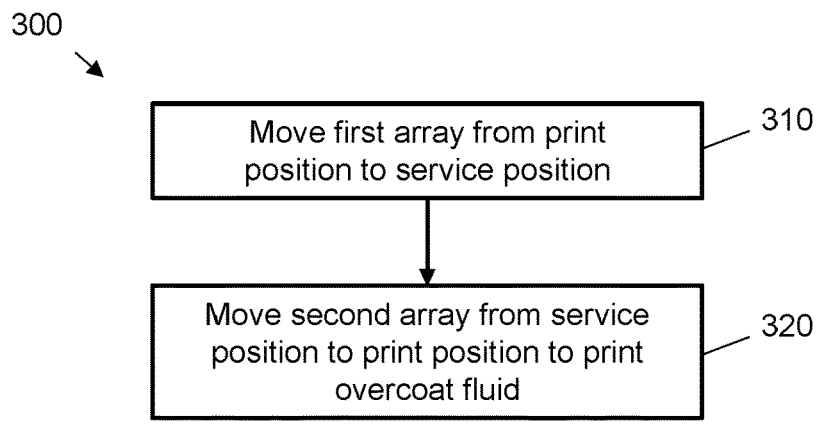
FIG. 3 is a flow chart illustrating a method for operating a plurality of print head arrays according to an example.

FIG. 3 shows a method 300 of operating a plurality of print head arrays according to an example. The plurality of print head arrays may be comprised in a deposit mechanism such as deposit mechanism 110. In some examples, the method 300 is performed by an array controller such as array controller 150. The method 300 may be performed during an ongoing overcoat printing operation. In other words, the method 300 may be performed in parallel with an ongoing overcoat printing operation.

The plurality of print head arrays includes at least a first print head array and a second print head array. In some examples, the plurality of print head arrays includes more than two print head arrays. Each of the plurality of print head arrays is arrangeable independently in a print position and a service position. When a given print head array of the plurality of print head arrays is arranged in the print position, the given print head array is configured to print an overcoat fluid onto a print medium. When the given print head array is arranged in the service position, servicing may be performed on the given print head array.

At item 310, the first print head array is moved from the print position to the service position. Moving the first print head array to the service position allows servicing to be performed on the first print head array. The first print head array is moved from the print position to the service position according to a periodic servicing sequence. In some examples, the periodic servicing sequence has a predefined service period between servicing operations for each of the plurality of print head arrays. In some examples, the predefined service period is determined by at least one property of the overcoat fluid. In some examples, the periodic servicing sequence is determined by the number of print head arrays in the plurality of print head arrays.

In some examples, moving the first print head array from the print position to the service position involves moving the first print head array in a perpendicular direction relative to the print medium, for example by raising or lifting the first print head array. In some examples, moving the first print head array from the print position to the service position involves a lateral and/or a translational movement of the first print head array.

At item 320, the second print head array is moved from the service position to the print position. Moving the second print head array to the print position allows the second print head array to print the overcoat fluid whilst a servicing operation is performed on the first print head array.

In some examples, moving the second print head array from the service position to the print position involves moving the second print head array in a perpendicular direction relative to the print medium, for example by lowering the second print head array. In some examples, moving the second print head array from the service position to the print position involves a lateral and/or a translational movement of the second print head array.

In some examples, the first print head array is moved to the service position whilst the overcoat fluid is printed by one or more other print head arrays of the plurality of print head arrays, for example the second print head array. In other words, the first print head array may be moved to the service position without interruption of an ongoing overcoat printing operation.

In some examples, the first print head array is moved to the service position whilst one or more other print head arrays are in the service position. In some examples, the first print head array is moved to the service position simultaneously with one or more other print head arrays of the plurality of print head arrays. As such, multiple print head arrays may be moved and/or serviced simultaneously.

In this example, the second print head array is moved from the service position to the print position after the first print head array is moved from the print position to the service position. In some other examples, the second print head array is moved from the service position to the print position before the first print head array is moved from the print position to the service position. In some other examples, the second print head array is moved from the service position to the print position simultaneously with the first print head array being moved from the print position to the service position. As such, although items 310 and 320 are shown in this example as subsequent procedures, in other examples their order may be reversed or they may form part of a single operation.

One or both of items 310 and 320 may be performed repeatedly during an ongoing overcoat printing operation. For example, the first print head array may be moved from the print position to the service position whenever it is determined that a predefined service period for the first print head array expires.

Figure 4:
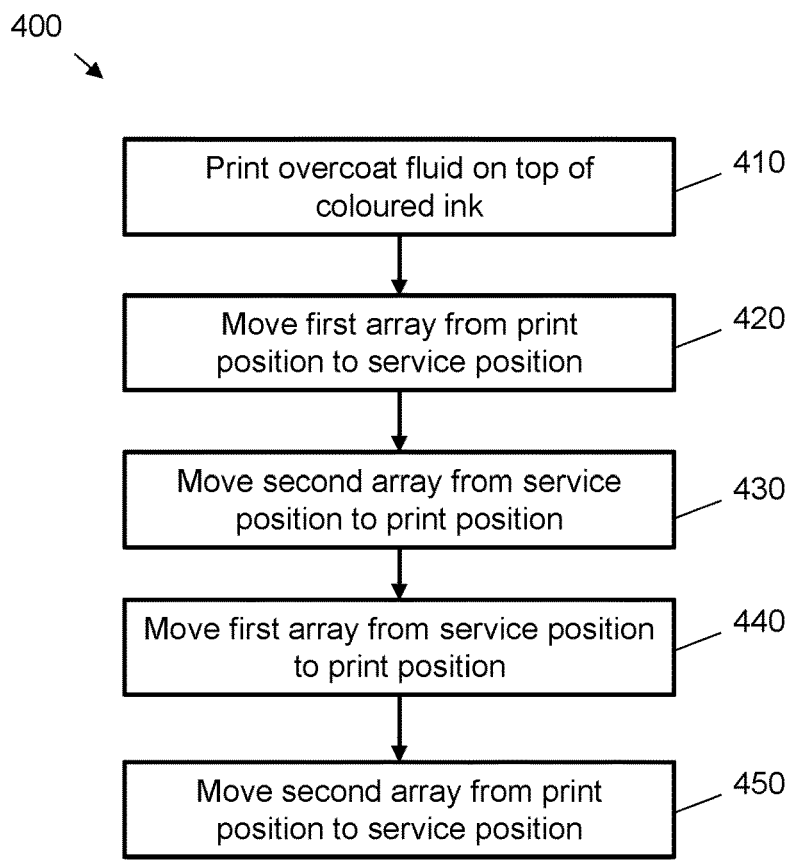
FIG. 4 is a flow chart illustrating a method for operating a plurality of print head arrays according to an example.

FIG. 4 shows a method of operating a plurality of print head arrays according to an example. The plurality of print head arrays may be comprised in a deposit mechanism such as deposit mechanism 110. In some examples, the method 400 is performed by an array controller such as array controller 150.

The plurality of print head arrays includes at least a first and a second print head array. Each of the plurality of print head arrays is independently arrangeable in a print position to print an overcoat fluid onto a print medium and a service position to enable servicing to be performed.

At item 410, an overcoat fluid is printed on top of a colored ink. In some examples, the colored ink may be deposited onto the print medium. In such examples, the overcoat fluid is deposited onto the print medium after the colored ink is deposited onto the print medium. The overcoat fluid may be printed by one or more of the plurality of print head arrays. In some examples, the overcoat fluid is printed by a subset of the plurality of print head arrays. In some examples, the colored ink is deposited by one or more of the plurality of print head arrays. In other examples, the colored ink is not deposited by any of the plurality of print head arrays. In such examples, the plurality of print head arrays is used exclusively for printing the overcoat fluid. The colored ink may be deposited separately, for example by a separate printing apparatus.

At item 420, the first print head array of the plurality of print head arrays is moved from the print position to the service position. Moving the first print head array to the service position enables servicing to be performed on the first print head array. The first print head array is moved to the service position according to a periodic servicing sequence.

At item 430, the second print head array of the plurality of print head arrays is moved from the service position to the print position to print the overcoat fluid whilst a servicing operation is performed on the first print head array.

In this example, items 420 and 430 are shown as subsequent procedures. In other examples their order may be reversed or they may form part of a single operation. For example, the first print head array may be moved to the service position concurrently with the second print head array being moved to the print position.

At item 440, the first print array is moved from the service position to the print position. In some examples, the first print head array is moved to the print position according to the periodic servicing sequence. In some examples, the first print head array is moved to the print position when it is determined that at least one further print head array of the plurality of print head arrays is to be serviced. In some examples, the first print head array is moved to the print position when it is determined that a servicing operation performed on the first print head array is completed.

At item 450, the second print array is moved from the print position to the service position. Moving the second print head array to the service position enables servicing to be performed on the second print head array. The second print head array may be moved to the service station whilst the overcoat fluid is printed by one or more other print head arrays of the plurality of print head arrays, for example the first print head array. In other words, the second print head array may be moved to the service position without interruption of an ongoing overcoat printing operation. In some examples, the second print head array is moved from the print position to the service position according to the periodic servicing sequence. For example, the second print head array may be moved to the service position based on a predefined service period between servicing operations for the second print head array.

In this example, items 440 and 450 are shown as subsequent procedures. In other examples their order may be reversed or they may form part of a single operation. For example, the first print head array may be moved to the print position concurrently with the second print head array being moved to the service position.

Any of items 420 to 450 may be performed repeatedly during an ongoing overcoat printing operation. For example, the first print head array may be moved from the print position to the service position, may then be moved back to the print position and may be moved again to the service position. In some examples, the first print array and/or the second print head array are moved from the print position to the service position whenever it is determined that a predefined service period for the first print head array and/or the second print head array expires.

Figure 5:
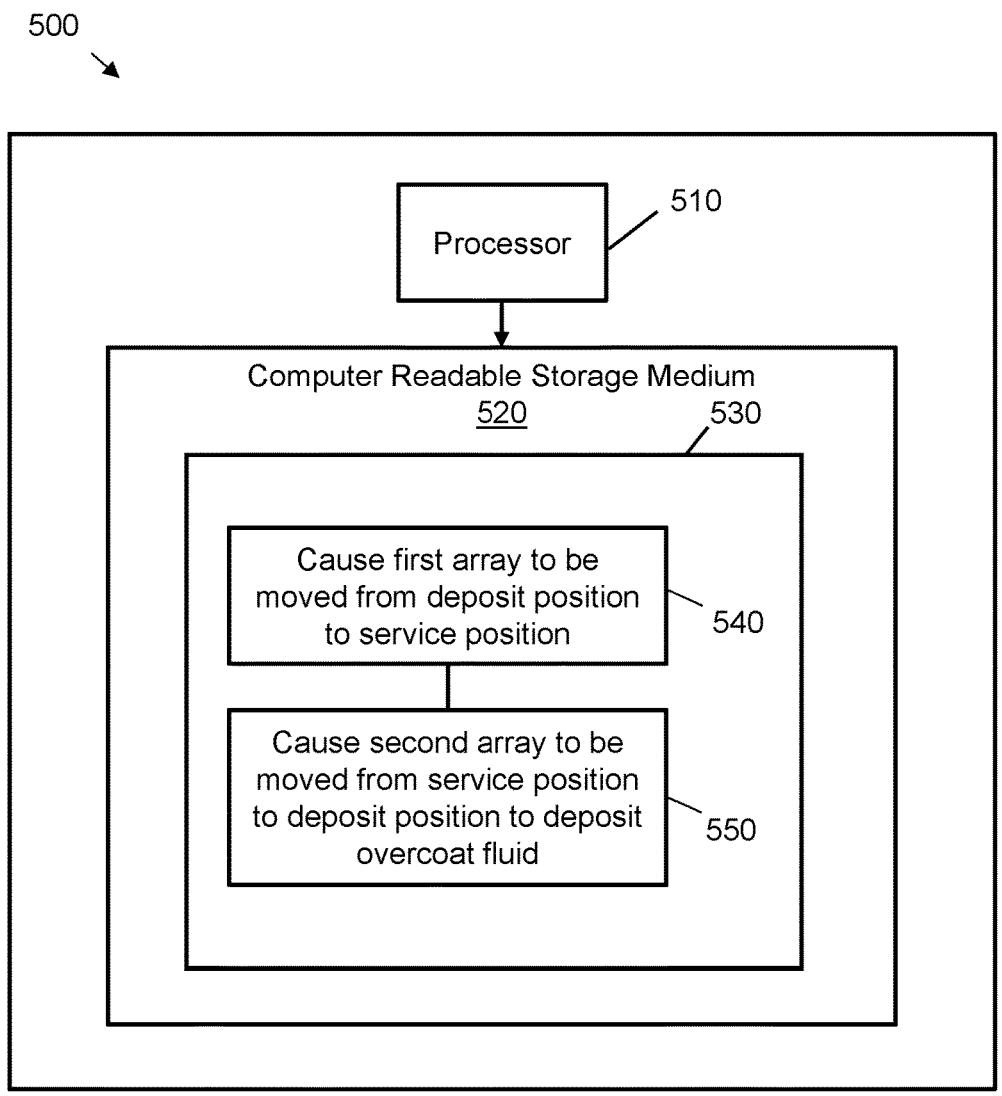
FIG. 5 is a schematic diagram of a processor and a computer readable storage medium with instructions stored thereon according to an example.

FIG. 5 shows example components of an apparatus 500, which may be arranged to implement certain examples described herein. A processor 510 of the apparatus 500 is connectably coupled to a computer-readable storage medium 520 comprising a set of computer-readable instructions 530 stored thereon, which may be executed by the processor 510. The computer-readable instructions 530 instruct the processor 510 to perform a method of controlling a plurality of print head arrays including at least a first and a second print head array. Each of the plurality of print head arrays is arrangeable in a deposit position to deposit an overcoat fluid onto a substrate and a service position to enable servicing performed. Instruction 540 instructs the processor 510 to cause the first print head array to be moved from the deposit position to the service position according to a periodic servicing sequence. In some examples, the periodic servicing sequence has a predefined service period between servicing operations for each of the plurality of print head arrays. Instruction 550 instructs the processor 510 to cause the second print head array to be moved from the service position to the print position to deposit the overcoat fluid whilst a servicing operation is performed on the first print head array.

Processor 510 can include a microprocessor, microcontroller, processor module or subsystem, programmable integrated circuit, programmable gate array, or another control or computing device. The computer-readable storage medium 520 can be implemented as one or multiple computer-readable storage media. The computer-readable storage medium 520 includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 530 can be stored on one computer-readable storage medium, or alternatively, can be stored on multiple computer-readable storage media. The computer-readable storage medium 520 or media can be located either in the printing system 500 or located at a remote site from which computer-readable instructions can be downloaded over a network for execution by the processor 510.

The preceding description has been presented to illustrate and describe examples of the principles described. This description is not intended to be exhaustive or to limit these principles to any precise form disclosed. Many modifications and variations are possible in light of the above teaching.

What is claimed is:

1. An apparatus comprising:
a depositing mechanism to perform an overcoat depositing operation, the depositing mechanism comprising a plurality of print head arrays each being arrangeable in a deposit position to deposit an overcoat layer onto a substrate and a service position to enable servicing to be performed; and
an array controller to cause a first print head array of the plurality of print head arrays to be moved periodically from the deposit position to the service position according to a predefined servicing sequence during an ongoing overcoat depositing operation performed by the depositing mechanism;
wherein the array controller moves the first print head array from the deposit position to the service position based on a predefined service interval over which the first print head array is able to deposit an overcoat fluid to form the overcoat layer without clogging occurring; and
wherein the predefined servicing sequence has the first print head array active at the deposit position for twice as long a period of time as the first print head is being serviced at the service position.

2. The apparatus of claim 1, wherein the predefined service interval is determined by at least one characteristic of the overcoat layer.

3. The apparatus of claim 1, wherein the array controller causes a second further print head array of the plurality of print head arrays to be moved from the deposit position to the service position when the first print head array is in the deposit position.

4. The apparatus of claim 1, comprising a service module to perform servicing on the first print head array when the first print head array is in the service position, wherein the service module is moveable between different print head arrays of the plurality of print head arrays.

5. The apparatus of claim 1, wherein the predefined servicing sequence is determined by the number of print head arrays in the plurality of print head arrays.

6. The apparatus of claim 1, the apparatus being arranged to deposit the overcoat layer over an ink layer printed upon the substrate.

7. The apparatus of claim 1, wherein the array controller moves at least two of the plurality of print head arrays to the service position for simultaneous servicing.

8. The apparatus of claim 1, wherein the array controller moves the at least one print head array vertically away from the substrate to the service position.

9. The apparatus of claim 1, further comprising a supply of a different fluid from the overcoat fluid, the at least one print head array being supplied with the different fluid for spitting to clean the at least one print head array whilst in the service position.

10. A non-transitory computer-readable storage medium comprising a set of computer-readable instructions stored thereon, which, when executed by a processor, cause the processor to perform a method of controlling a plurality of print head arrays each being arrangeable in a deposit position to deposit an overcoat fluid onto a substrate and a service position to enable servicing to be performed, the method comprising:
causing the first print head array to be moved from the deposit position to the service position according to a periodic servicing sequence, the periodic servicing sequence determined by a period of time at which the first print head array deposits the overcoat fluid without becoming clogged;
causing the second print head array to be moved from the service position to the print position to deposit the overcoat fluid whilst a servicing operation is performed on the first print head array; and
wherein the first print head array is active at the print position and inactive at the service position for equal amounts of time.

11. The non-transitory computer-readable storage medium of claim 10, the method further comprising moving at least two of the plurality of print head arrays to the service position for simultaneous servicing.

12. A method of operating a plurality of print head arrays including at least a first print head array and a second print head array, each of the plurality of print head arrays being arrangeable independently in a print position to print an overcoat fluid onto a print medium and in a service position to enable servicing to be performed, the method comprising:
moving the first print head array from the print position to the service position according to a periodic servicing sequence;

moving the second print head array from the service position to the print position to print the overcoat fluid whilst a servicing operation is performed on the first print head array; and wherein one from the set of "A" and "B" occurs, where "A" is that the first print head array is active at the print position and inactive at the service position for equal amounts of time, and "B" is that the first print head array active at the print position for twice as long a period of time as the first print head is being serviced at the service position.

13. The method of claim 12, wherein the periodic servicing sequence has a predefined service period between servicing operations for each of the plurality of print head arrays, the predefined service period determined by a time interval over which the first print head array is able to reliably deposit the overcoat fluid without becoming clogged.

14. The method of claim 13, wherein the predefined service period is determined by at least one property of the overcoat fluid.

15. The method of claim 12, comprising:
moving the first print head array from the service position to the print position; and
moving the second print head array from the print position to the service position when the first print head array is in the print position.

16. The method of claim 12, wherein the predefined servicing sequence is determined by the number of print head arrays in the plurality of print head arrays.

17. The method of claim 12, comprising printing the overcoat fluid on top of a coloured ink.

18. The method of claim 12, further comprising moving at least two of the plurality of print head arrays to the service position for simultaneous servicing.

* * * * *

UNITED STATES PATENT AND TRADEMARK OFFICE
CERTIFICATE OF CORRECTION

PATENT NO. : 10,377,161 B2
APPLICATION NO. : 15/681533
DATED : August 13, 2019
INVENTOR(S) : Veis et al.

Page 1 of 1

It is certified that error appears in the above-identified patent and that said Letters Patent is hereby corrected as shown below:

In the Claims

In Column 12, Line 7, in Claim 3, after "second" delete "further".

In Column 13, Lines 4-5, in Claim 12, delete "and and" and insert -- and --, therefor.

In Column 13, Line 18, in Claim 13, before "deposit" delete "reliably".

Signed and Sealed this
Fourteenth Day of January, 2020

Andrei Iancu
*Director of the United States Patent and Trademark Office*